(No Model.)

T. H. ALLEN.
PROPELLING POWER.

No. 443,347. Patented Dec. 23, 1890.

Witnesses

Inventor
Thomas H. Allen
by Donald C. Ridout & Co.
attys.

UNITED STATES PATENT OFFICE.

THOMAS H. ALLEN, OF TORONTO, CANADA.

PROPELLING-POWER.

SPECIFICATION forming part of Letters Patent No. 443,347, dated December 23, 1890.

Application filed June 25, 1890. Serial No. 356,697. (No model.)

*To all whom it may concern:*

Be it known that I, THOMAS HENRY ALLEN, mechanic, of the city of Toronto, in the county of York, in the Province of Ontario, Canada, have invented a certain new and Improved Propelling-Power, of which the following is a specification.

The object of the invention is to provide a propelling-power specially suitable for row-boats, and by which the ordinary reciprocating movement of rowing shall produce a rotary movement; and it consists of a shaft carried in suitable bearings located in the bottom of the boat through the stern, through which it projects and has a propeller-wheel fixed to its end, the said shaft having right and left hand screws formed on it, with which a pivoted dog in a cross-head suitably supported in guides is forced by the action of a rod or handle pushed or pulled upon by the occupant of the boat, forcing the dog first to engage with the right-hand screw and then with the left-hand screw, or vice versa, so that the shaft shall revolve in the same direction whether the said dog is moved backward or forward, substantially as hereinafter more particularly explained.

Figure 1:
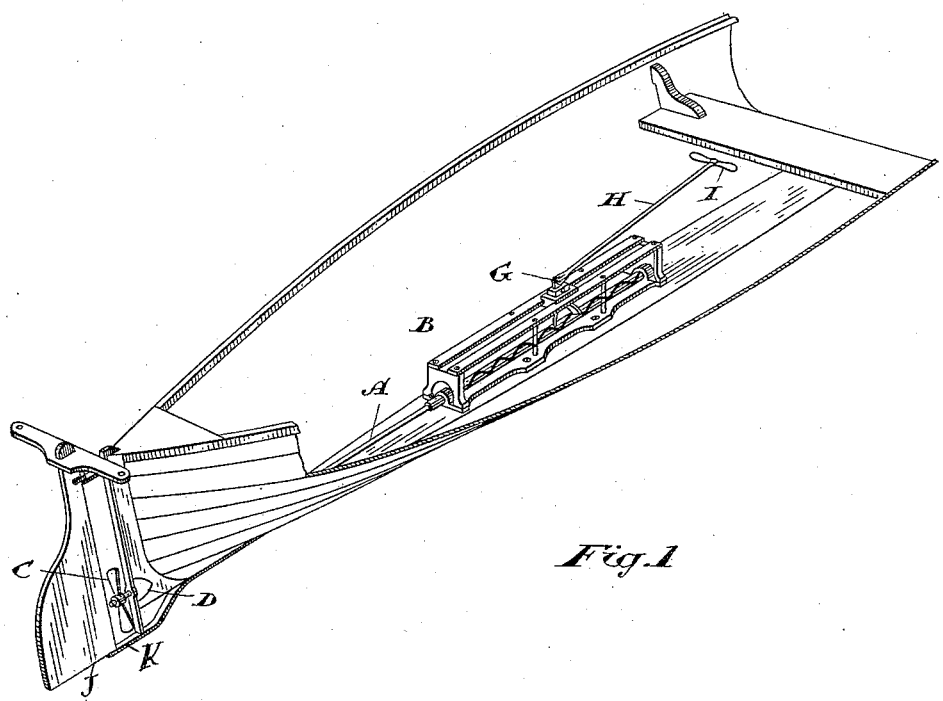
Figure 2:
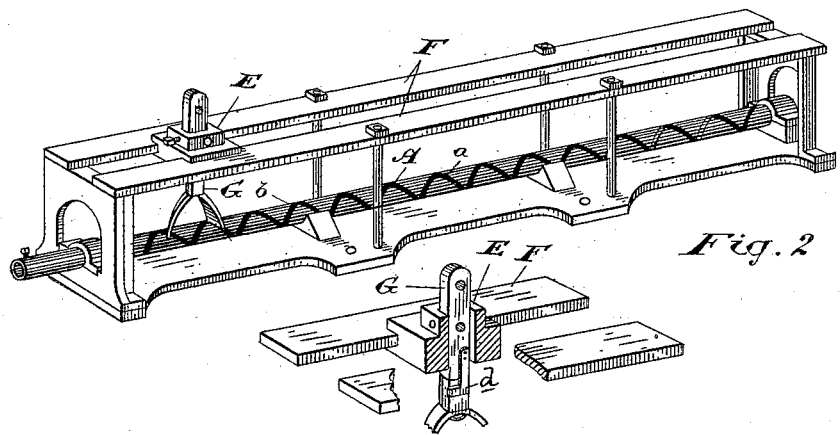
Figure 3:
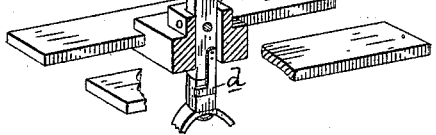

Figure 1 is a perspective view of a portion of the boat, showing my improved propelling-power apparatus inserted in position. Fig. 2 is a perspective view of a detail of the apparatus. Fig. 3 is a perspective detail view of the dog and its cross-head.

In the drawings, A represents a shaft suitably journaled in the bottom of the boat; B, the end of the shaft projecting through the stern of the boat and having a propeller-wheel C fixed to it, as indicated. This shaft A is preferably made in two portions detachably connected, as shown.

D is a suitable stuffing-box located at the stern of the boat B and forming a water-tight bearing for the end of the shaft A.

$a$ is a right-hand screw, and $b$ a left-hand screw, formed in the shaft A.

E is a cross-head carried on suitable guide-rods F, which are preferably made of a portion of a light frame fixed to the bottom of the boat B.

G is a two-tailed dog pivoted in the cross-head E, one tail of the dog G being made to engage with the right-hand screw $a$, while the other tail is designed to engage with the left-hand screw $b$.

For the purpose of enabling the shaft A to be revolved in the reverse direction I form a swivel-joint between the lower portion of the dog G and its upper part, which is pivoted in the cross-head E, a spring $d$ being fixed to the upper portion of the dog and arranged to act against the lower portion, the top of which has two flat sides, which the spring by acting against holds the dog stationary.

H is a rod connected to the dog G at one end and having a cross-handle I fixed to its other end. When the rod H is pushed upon, the dog G is tilted on its pivot and its front tail is forced to engage with the upper screw, which its point is shaped to fit. As the cross-head E is forced forward the tail of the dog forced to engage with the screw causes the shaft A to revolve. When the end of the stroke is reached, the rod H is pulled upon and the point of the other tail of the dog is forced to engage with its screw, which, being formed in the opposite direction to the first screw, causes the dog in traveling to make the shaft continue to revolve in the same direction.

In order to reverse the shaft it is merely necessary to turn the dog G on its swivel.

A propelling-power such as I have described can be very easily and cheaply applied to any class of boats, and in row-boats the delightful exercise of rowing may be secured while the boat is being propelled at a much greater speed than can be secured by the use of ordinary sculls.

I only show one rod H with a handle I; but of course it will be seen that for a heavy boat it may be advisable to duplicate the rod and handle, so that two parties may be simultaneously employed in producing the necessary propelling-power.

J is a rudder carried in a light frame K, shaped so as to hold the rudder J behind the propeller-wheel C and at the same time constitute a guard over the said propeller.

What I claim as my invention is—

1. A shaft supported in suitable bearings in the bottom of a boat and having a propeller-wheel fixed to its end which projects through the end of the said boat, and a right and left screw formed on the portion of the shaft within the boat, in combination with a pivoted dog having dovetails carried in a suitable cross-head and operated by a rod or handle in such a manner that each tail of the dog is thrown into engagement alternately with the screw formed in the shaft, substantially as and for the purpose specified.

2. A shaft supported in suitable bearings in the bottom of a boat and having a propeller-wheel fixed to its end which projects through the end of the said boat and having a right and left hand screw formed on the portion of the shaft within the boat, in combination with a two-tailed dog pivoted in a cross-head supported in suitable guides, a swivel-joint being formed between the two-tailed portion of the dog and its pivoted body, the said dog being operated by a rod or handle, substantially as and for the purpose specified.

Toronto, May 1, 1890.

THOMAS H. ALLEN.

In presence of—
CHARLES C. BALDWIN,
E. CUMMINGS.